United States Patent
Jibbe et al.

(10) Patent No.: US 8,140,762 B2
(45) Date of Patent: Mar. 20, 2012

(54) SYSTEM TO REDUCE DRIVE OVERHEAD USING A MIRRORED CACHE VOLUME IN A STORAGE ARRAY

(75) Inventors: Mahmoud K. Jibbe, Wichita, KS (US); Senthil Kannan, Pondicherry (IN)

(73) Assignee: LSI Corporation, Milpitas, CA (US)

( * ) Notice: Subject to any disclaimer, the term of this patent is extended or adjusted under 35 U.S.C. 154(b) by 371 days.

(21) Appl. No.: 12/417,096

(22) Filed: Apr. 2, 2009

(65) Prior Publication Data
US 2009/0265507 A1 Oct. 22, 2009

Related U.S. Application Data

(60) Provisional application No. 61/046,815, filed on Apr. 22, 2008, provisional application No. 61/080,806, filed on Jul. 15, 2008, provisional application No. 61/080,762, filed on Jul. 15, 2008, provisional application No. 61/100,034, filed on Sep. 25, 2008.

(51) Int. Cl.
*G06F 12/00* (2006.01)
*G06F 12/08* (2006.01)
*G06F 12/02* (2006.01)

(52) U.S. Cl. ........ 711/129; 711/103; 711/125; 711/118; 711/E12.001; 711/E12.008; 711/E12.02

(58) Field of Classification Search .................. 711/129, 711/118, 154, 114, 147, 125
See application file for complete search history.

(56) References Cited

U.S. PATENT DOCUMENTS

| | | | |
|---|---|---|---|
| 5,586,291 A | 12/1996 | Lasker et al. | 395/440 |
| 5,974,506 A | 10/1999 | Sicola et al. | 711/120 |
| 6,446,237 B1 | 9/2002 | Menon | 714/800 |
| 6,574,709 B1 | 6/2003 | Skazinski et al. | 711/119 |
| 6,912,669 B2 | 6/2005 | Hauck et al. | 714/6 |
| 2003/0212869 A1 | 11/2003 | Burkey | 711/162 |
| 2003/0212870 A1 | 11/2003 | Nowakowski | 711/162 |
| 2004/0117438 A1 | 6/2004 | Considine et al. | 709/203 |
| 2004/0117580 A1 | 6/2004 | Wu et al. | 711/170 |
| 2005/0050273 A1 | 3/2005 | Horn et al. | 711/114 |
| 2005/0172074 A1 | 8/2005 | Sinclair | 711/114 |
| 2005/0216660 A1 | 9/2005 | Kobayashi et al. | 711/113 |
| 2006/0206663 A1* | 9/2006 | Kuwata | 711/114 |
| 2007/0050571 A1* | 3/2007 | Nakamura et al. | 711/154 |
| 2008/0256316 A1 | 10/2008 | Evanchik et al. | 711/162 |

FOREIGN PATENT DOCUMENTS

EP 2237157 A1 3/2010

* cited by examiner

*Primary Examiner* — Hoai V Ho
*Assistant Examiner* — Tri Hoang
(74) *Attorney, Agent, or Firm* — Christopher P. Maiorana, PC

(57) ABSTRACT

A system comprising a host, a solid state device, and an abstract layer. The host may be configured to generate a plurality of input/output (IO) requests. The solid state device may comprise a write cache region and a read cache region. The read cache region may be a mirror of the write cache region. The abstract layer may be configured to (i) receive the plurality of IO requests, (ii) process the IO requests, and (iii) map the plurality of IO requests to the write cache region and the read cache region.

20 Claims, 3 Drawing Sheets

SYSTEM TO REDUCE DRIVE OVERHEAD USING A MIRRORED CACHE VOLUME IN A STORAGE ARRAY

CROSS REFERENCE TO RELATED APPLICATIONS

The present application may relate to co-pending application Ser. No. 61/046,815, filed Apr. 22, 2008; Ser. No. 12/143,123, filed Jun. 20, 2008; Ser. No. 61/080,806, filed Jul. 15, 2008; Ser. No. 61/080,762, filed Jul. 15, 2008; Ser. No. 12/178,064, filed Jul. 23, 2008; Ser. No. 12/238,858, filed Sep. 26, 2008; Ser. No. 61/100,034, filed Sep. 25, 2008; Ser. No. 12/324,224, filed Nov. 26, 2008; Ser. No. 12/354,126, filed Jan. 15, 2009 and Ser. No. 12/395,786, filed Mar. 2, 2009, which are each hereby incorporated by reference in their entirety.

FIELD OF THE INVENTION

The present invention relates to storage arrays generally and, more particularly, to a method and/or apparatus for reducing drive overhead using a mirrored cache volume in a storage array.

BACKGROUND OF THE INVENTION

Current storage arrays (or controllers) make limited use of a controller cache. In a write through cache policy mode an input/output (IO) write request has to depend on the response time of the particular hard disk drive (HDD). In a heavy IO request storage array network (SAN) environment, the HDD response time is even further delayed. In an IO read-ahead cache policy, unwanted data is fetched which results in a direct read-to-HDD, with a delay corresponding to the HDD response time. The time consumed in the unwanted data fetch is wasted.

Write caches and read caches stored on DRAMs depend on writing to the HDD for the write through cache policy when there is no back-up battery for the caches. Writing to the HDD for the write through cache policy adds to the latency of the HDD. The read-ahead cache policy does not help reduce the latency of the HDD since the pre-fetch results of unwanted data adds to the time delay in getting the write data.

It would be desirable to implement a method and/or apparatus for reducing drive overhead using a mirrored cache volume in a storage array.

SUMMARY OF THE INVENTION

The present invention concerns a system comprising a host, a solid state device, and an abstract layer. The host may be configured to generate a plurality of input/output (IO) requests. The solid state device may comprise a write cache region and a read cache region. The read cache region may be a mirror of the write cache region. The abstract layer may be configured to (i) receive the plurality of IO requests, (ii) process the IO requests, and (iii) map the plurality of IO requests to the write cache region and the read cache region.

The objects, features and advantages of the present invention include providing a method and/or apparatus that may (i) reduce hard disc overhead, (ii) implement a mirrored cache volume in a storage array, (iii) allow the write through mode to write to a solid state drive (SSD) cache in place of a typical hard disk drive (HDD), (iv) create LUNs with a mirrored cache volume during creation of the LUNs, (v) create the mirrored cache volumes after the LUNs are created, (vi) asynchronously mirror existing data until all data is mirrored and synchronously written to the HDD and the mirrored LUN, (vii) use the mirrored cache volume for read IO requests (instead of the HDD) to avoid the HDD latency, (viii) provide a user selectable mirrored cache volume, (ix) allow the read cache using the mirrored cache volume to be a SSD (or a flash drive), (x) have the write cache and the read cache on the SSD separate from DRAMs, (xi) write on the HDD for write through cache policy in case of no back-up battery for the write cache, (xii) may be written to an SSD write cache, (xiii) allow read IO requests to be serviced faster for LUNs having the mirrored cache volume of the read cache region, (xiv) eliminate the pre-fetch read cache mode and resultant unwanted data due to wrong predictions, and/or (xv) save processing time and HDD latency.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
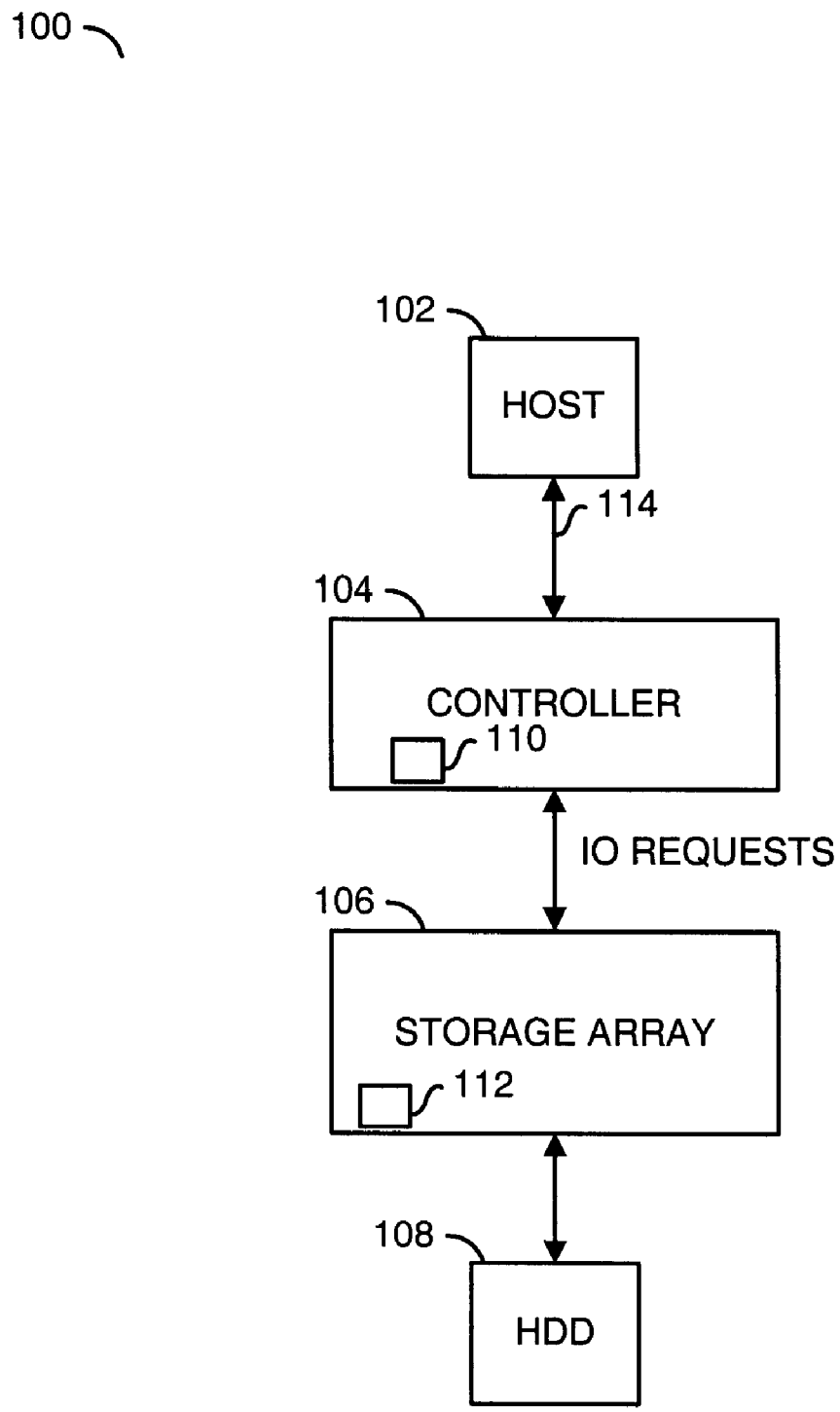
FIG. 1 is a block diagram of an embodiment of the present invention.

Referring to FIG. 1, a block diagram of the system 100 is shown in accordance with a preferred embodiment of the present invention. The system 100 generally comprises a module 102, a module 104, a module 106, a module 108, a module 110, a module 112 and a connection 114. The module 102 may be implemented as a server. In one example, the module 102 may be implemented as a host. The module 104 may be implemented as a controller. The module 106 may be implemented as a storage array. The module 108 may be implemented as a hard disk drive (HDD). In one example, the HDD 108 may implement a number of physical disks (e.g., P1, P2, P3). The number of physical disks may be varied to meet the design criteria of a particular implementation. In one example, the HDD 108 may be part of the storage array 106. The controller 104 may include the module 110. The module 110 may be implemented as an input/output (IO) abstract layer. The module 106 may include the module 112. The module 112 may be implemented as a solid state device. The connection 114 may be a network connection, such as a fiber channel connection or other type of network connection. The system 100 may reduce over head caused by latency in accessing the HHD 108 of the storage array 106.

Figure 2:
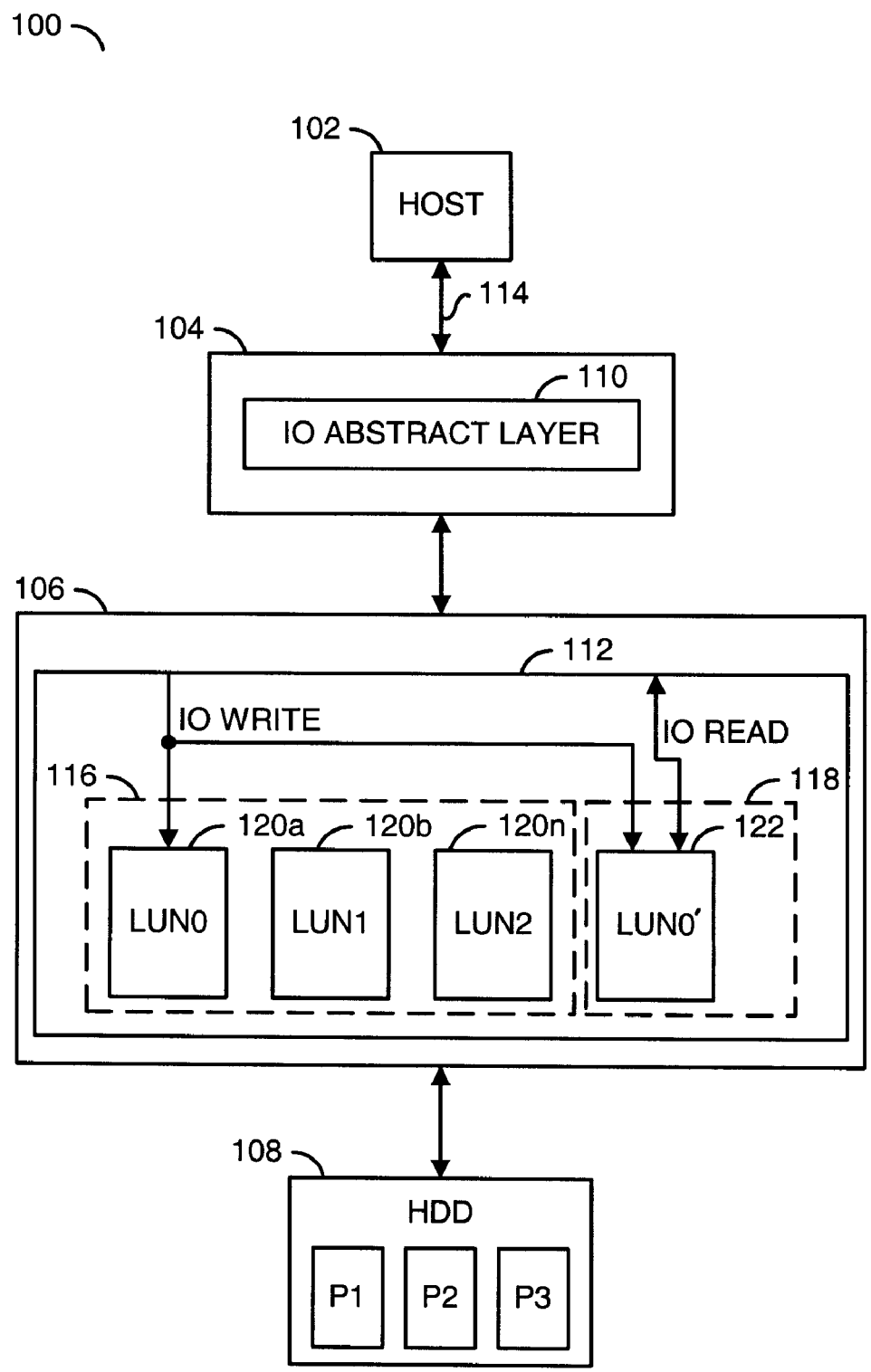
FIG. 2 is a more detailed block diagram of an embodiment of the present invention.

Referring to FIG. 2, a more detailed block diagram of the system 100 is shown. The module 112 generally comprises a write cache region 116 and a read cache region 118. In one example, the write cache region 116 and the read cache region 118 may be located (e.g., mapped) in different locations of the SSD 112. The write cache region 116 generally comprises a plurality of LUNs 120a-120n (e.g., LUN0, LUN1, LUN2, etc.). The read cache region 118 generally comprises a LUN 122 (e.g., LUN0'). In one example, the LUN 122 may be implemented as a mirrored cache volume of a particular one of the LUNs 120a-120n (e.g., the LUN 120a). The particular number of LUNs 120a-120n and LUN 122 may be varied (e.g., increased and/or decreased) to meet the design criteria of a particular implementation (e.g., up to 2048 or more). IO requests are normally sent to the LUNs 120a-120n and LUN 122, which translate such requests to storage devices (e.g., the physical disks P1, P2, or P3) in the storage array 106.

The controller 104 (or firmware) may be configured with the IO abstract layer 110. An IO request to be processed from the host 102 may be sent to the IO abstract layer 110. The IO abstract layer 110 may have a mapping to the write cache region 116 and the read cache region 118 of the solid state device 112 (e.g., the LUNs 120a-120n and the LUN 122). The write cache region 116 may be mapped on the SSD 112. The read cache region 118 may be mapped on another location (or region) of the SSD 112. In one example, the read cache region 118 may be mapped on a flash drive. The read cache region 118 may be a mirror of the write cache region 116 of a particular one of the LUNs 120a-120n. For example, an IO write request for the LUN 120a (e.g., LUN0) may be mapped to the write cache region 116 of the SSD 112. The IO write request may be synchronously (or asynchronously) mirrored to the read cache region 118.

The IO abstract layer 110 may return a signal (e.g., a good status signal) to the host 102 when the IO write is complete. An IO read request for the LUN 122 (e.g., LUN0') may be sent to the IO abstract layer 110 from the host 102. The IO abstract layer 110 may read the mirrored read cache region 118 from the LUN 122 to retrieve desired data. The IO abstract layer 110 may not need to read from the HDD 108 if the desired data is stored in the read cache region 118 of the SDD 112. If the desired data is stored in the read cache region 118 of the SSD 112, then the delay in response time associated with reading from the HDD 108 may be avoided. In one implementation, the IO write requests may be asynchronously written to the HDD 108 (e.g., the write cache region 116) and to the mirrored read cache region 118 of the SSD 112.

The IO write request may be sent to the IO abstract layer 110 from the host (or initiator) 102. The IO abstract layer 110 may write the IO request to the SSD 112 (e.g., the write cache region 116). The IO abstract layer 110 may send a signal (e.g., a "good" status signal) to the host 102. In one example, the IO abstract layer 110 may write the IO request to the SSD 112 and send the good status signal to the host 102 on a write through cache policy. The IO abstract layer 110 may send the good status signal to the host 102 while writing the IO request on a write back cache policy to the controller/array DRAM. The IO abstract layer 110 may process the IO read request from the LUN 122 instead of processing the IO read request from the write cache region 116 (e.g., the LUN 120a) of the SSD 112.

An IO read request may be sent from the host 102. The IO read request may be sent to the IO abstract layer 110. The IO abstract layer 100 may asynchronously write previous IO requests to the LUNs 120a-120n (e.g., the LUN0) in the HDD 108. The IO requests may be mirrored to the LUN 122 in the read cache region 118. In one example, the LUN 122 may be a mirrored cache volume of a particular one of the LUNs 120a-120n (e.g., the LUN0). The LUNs 120a-120n and the LUN 122 may be written synchronously (or asynchronously) by the IO abstract layer 110. The mirrored LUN 122 in the read cache region 118 may be created during the configuration of the LUNs 120a-120n. The LUN 122 may be mapped during the configuration of the LUNs 120a-120n. In one example, the LUN 122 may be mapped based upon a user selection depending on a particular design implementation.

One or more of the LUNs 120a-120n (e.g., 120b-120n) may be configured without a mirrored cache volume. The LUNs 120b-120n may be configured to use a read pre-fetch cache policy (e.g., currently present in LSI storage arrays). To process the IO read request, the IO abstract layer 110 may read the mirrored cache volume (e.g., the read cache region 118) from the LUN 122. The IO read request processing may be faster from the LUN 122 than a IO read request processing from the HDD 108 (e.g., the write cache region 116). The IO read request may be returned to the host 102.

Figure 3:
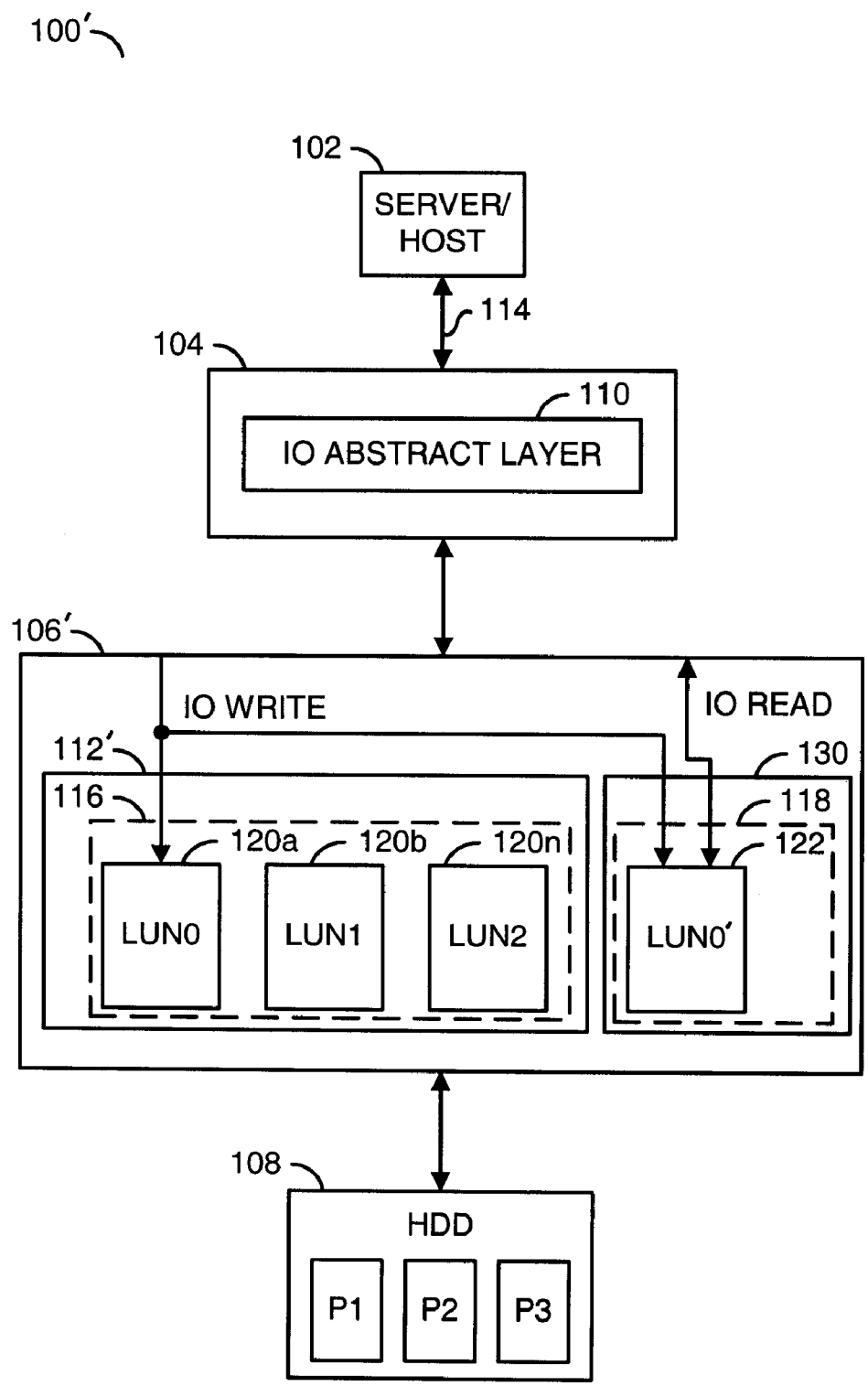
FIG. 3 is a block diagram of another embodiment of the present invention.

Referring to FIG. 3, a block diagram of the system 100' is shown. The system 100' generally comprises the host 102, the controller 104, a module 106', and the HDD 108. The controller 104 may implement the IO abstract layer 110. The module 106' may be implemented as a storage array. The storage array 106' generally comprises the module 112, and the module 130. The module 112' may be implemented as a solid state device (SSD). The SSD 112' generally comprises the write cache region 116. The write cache region generally comprises the plurality of LUNs 120a-120n. The module 130 may be implemented as a flash drive. The flash drive 130 generally comprises the read cache region 118. The read cache region may include the LUN 122. In one example, the flash drive 130 may include a plurality of LUNs configured to mirror the plurality of LUNs 120a-120n.

A manufacturing cost may be associated with implementing a solid state drive (SSD) or a flash drive to store an entire mirrored LUN. By implementing a mirror for certain LUNs, a performance to cost balance may be achieved. The improvement in performance normally balances out with the additional cost of the SSD implementation.

While the invention has been particularly shown and described with reference to the preferred embodiments thereof, it will be understood by those skilled in the art that various changes in form and details may be made without departing from the scope of the invention.

The invention claimed is:

1. A system comprising:
a host configured to generate a plurality of input/output (IO) requests;
a drive array comprising (i) a solid state device and (ii) a plurality of hard disk drives (HDDs), said solid state device comprising (a) a write cache region and (b) a read cache region, wherein (A) said drive array stores and/or retrieves data in response to said input/output requests, (B) said read cache region is a data mirror of a portion of said write cache region and (C) said data mirror between said read cache region and said write cache region is synchronized at a time after said data is written to said write cache region to avoid latency overhead when accessing said read cache region; and
an abstract layer configured to (i) receive said plurality of IO requests, (ii) process said IO requests, and (iii) map said plurality of IO requests to said write cache region and said read cache region.

2. The system according to claim 1, wherein a IO write request is synchronously written to said write cache region and said read cache region.

3. The system according to claim 1, wherein a IO read request is processed at said read cache region.

4. The system according to claim 1, wherein said abstract layer runs on a controller.

5. The system according to claim 1, wherein said solid state device is implemented on a storage array.

6. The system according to claim 1, wherein said read cache region is mapped to a different location than said write cache region.

7. The system according to claim 1, wherein said abstract layer returns a signal to said host when a IO write request is completed.

8. The system according to claim 1, wherein said write cache region and said read cache region each comprise a LUN.

9. The system according to claim 1, wherein a IO write request is asynchronously written to said write cache region and said read cache region.

10. A method comprising the steps of:
   (A) generating a plurality of input/output (IO) requests;
   (B) receiving said plurality of IO requests;
   (C) processing said plurality of IO requests by storing and/or retrieving data from a drive array;
   (D) mapping said plurality of IO requests to a write cache region and a read cache region; and
   (E) mirroring a portion of said read cache region to said write cache region to form a data mirror, wherein said data mirror between said read cache region and said write cache region is synchronized at a time after said data is written to said write cache region to avoid latency overhead when accessing said read cache region.

11. The method according to claim 10, wherein step (D) further comprises the sub-step of:
   synchronously writing a IO write request to said write cache region and said read cache region.

12. The method according to claim 10, wherein said step (C) further comprises the sub-step of:
   processing a IO read request at said read cache region.

13. The method according to claim 10, further comprising a step of:
   returning a signal to a host after a IO write request is completed.

14. The method according to claim 10, wherein said read cache region and said write cache region each comprise a LUN.

15. The method according to claim 10, wherein step (D) further comprises the sub-step of:
   asynchronously writing a IO write request to said write cache region and said read cache region.

16. The method according to claim 10, wherein said read cache region comprises a flash drive.

17. The method according to claim 10, wherein said read cache region is mapped to a different location than said write cache region.

18. A system comprising:
   a host configured to generate a plurality of input/output (IO) requests;
   a drive array comprising (i) a solid state device and (ii) a plurality of hard disk drives (HDDs), said solid state device comprising a write cache region, wherein said drive array stores and/or retrieves data in response to said input/output requests;
   a flash drive comprising a read cache region, wherein (A) said read cache region is a data mirror of a portion of said write cache region, (B) said data mirror between said read cache region and said write cache region is synchronized at a time after said data is written to said write cache region to avoid latency overhead when accessing said read cache region and (C) said flash drive is separate from said solid state device; and
   an abstract layer configured to (i) receive said plurality of IO requests, (ii) process said IO requests, and (iii) map said plurality of IO requests to said write cache region and said read cache region.

19. The system according to claim 18, wherein a IO write request is synchronously written to said write cache region and said read cache region.

20. The system according to claim 18, wherein a IO write request is asynchronously written to said write cache region and said read cache region.

* * * * *